March 11, 1930.    F. C. KING    1,750,010

METHOD OF MAKING WELDED JOINTS FOR STEEL PIPE

Filed Nov. 11, 1926

INVENTOR
F. C. KING.
By C. B. Birkenbush
ATTORNEY

Patented Mar. 11, 1930

1,750,010

UNITED STATES PATENT OFFICE

FRED C. KING, OF PORTLAND, OREGON

METHOD OF MAKING WELDED JOINTS FOR STEEL PIPE

Application filed November 11, 1926. Serial No. 147,711.

This invention relates to the joining of steel pipes by means of autogeneous welding, and particularly to that form of joint in which the end of one pipe is enlarged or belted, either in the shop or in the field, for the purpose of receiving the end of a second pipe as normal outside diameter.

The first object of this invention is to provide an exceedingly simple and efficient pipe joint which will possess all of the advantages of a bell end joint without its accompanying disadvantages. These advantages arise from a lower first cost of producing the bell portion, and the fact that the overlap shall be small and the accompanying clearance shall be tapering and as small as practical in order that the inner pipe must be driven to its shoulder in the bell portion, thereby forming as tight a joint as possible between the outer end of the inner pipe and the inside of the belled portion.

The second object is to secure a metal to metal contact between the overlapped portion of the pipe, thereby reducing the corrosion area to a size which will quickly seal itself against further corrosive action rather than to provide a free open space between the overlapped portions of the pipe in which corrosion can occur repeatedly, due to the fact that the eddy currents set up in the free open spaces will flush out the rusted material and leave the metal exposed to further attack from the water, under which condition the bell portion of the pipe is the first to give way, as is a matter of common knowledge.

The third object is to reduce the clearance between the joined pipes to a minimum in order to insure a better laying of the pipes than when a free open space is provided around a pipe, in which case the inner pipe would naturally rest against one side of the bell, thereby doubling the size of the weld required at that point and increasing the size of the corroding pocket, as well as forming a shoulder or break in the pipe surface which is protective to the eddy currents.

The fourth object is to make is possible to secure the greatest deflection desirable in one joint of pipe without increasing the clearance between the pipes at the vertex of the angle thus being formed, and at the same time to make it possible to heat the side having the greatest clearance at the edge of the bell and lay same against the inner pipe in a metal to metal contact by means of a hammer or other instrument throughout the full length of the overlap.

Figure 1:
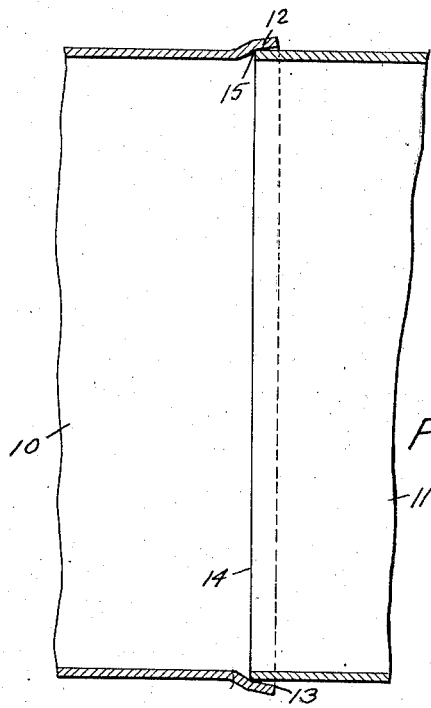
Figure 2:
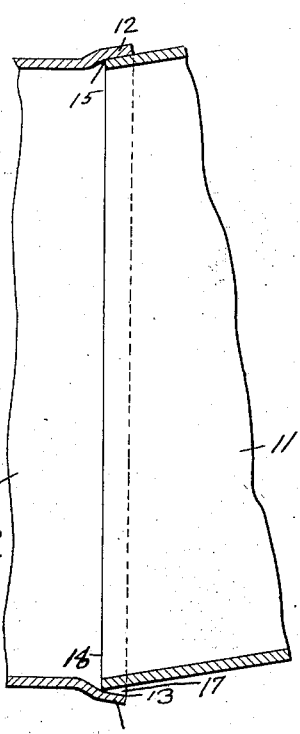
Figure 4:
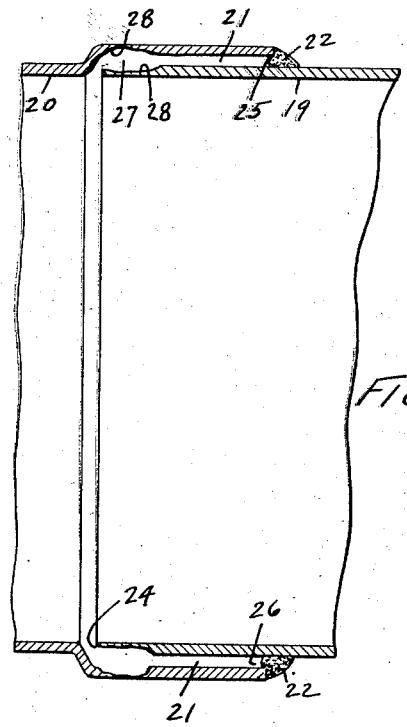
Figure 3:
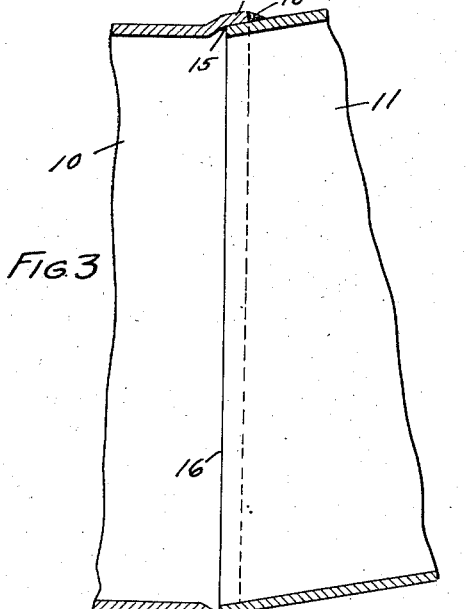

These, and other objects, will become more apparent from the specification following as illustrated in the accompanying drawing, in which:

Figure 1 is a longitudinal section through this joint showing the pipes joined together in a straight line. Figure 2 is a view similar to Figure 1 but showing the inner pipe cut off at an angle to its axis and inserted into the bell as a first step in making an angled joint. Figure 3 is a similar view showing the side of greatest clearance being laid up to the inner pipe and the two pipes joined together by means of a suitable weld. Figure 4 illustrates the condition existing when pipes are laid together with a considerable amount of clearance or free open space between their overlapped sections showing the manner in which the eddy currents wash away the corroded material in the bell portion of the pipe.

Similar numbers of reference refer to similar parts throughout the several views.

Before entering into the explanation of this method of joining pipe it must be understood that the mere joining of pipes by the bell end method is very well known and understood, both by users of iron, copper, lead and steel pipe. Also it has been a matter of common practice for many years to weld pipes together either by butting their ends together or by slipping a sleeve over the ends of two pipes or by belling one pipe and inserting the other pipe into same, various methods being employed to secure the final union of the pipes, ranging from packing and calking up to lead burning, brazing, soldering and various forms of welding.

For example, it has been common practice for many years for boiler makers wishing to extend the length of a tube to form a bell end joint between the pipes and then heat same in the forge and weld the bell ends together. Blower pipes, gas pipes, lead pipes for acid works, copper pipes on board ships and water pipes made of steel have also been joined by the bell end method reinforced by a weld, braze or solder.

It is, however, for the purpose of adapting this form of joint to large steel water pipes that the method about to be described has been evolved, this work being done preferably in the shop.

It is assumed that the end of the pipe 10 is to be joined to the end of the pipe 11. The pipe 10 is provided with a slightly flaring bell 12 whose diameter at the edge 13 is just large enough to admit the end 14 of the pipe 11, which pipe 11 is large enough to require driving in order to seat same against the shoulder 15 of the pipe 10. Assuming that the pipes 10 and 11 are to be joined in an angular relation, as shown in Figure 2, it will be necessary to first trim the edge 16 of the pipe 11. This naturally leaves the portion 17 with the greatest amount of clearance, which clearance has been greatly exaggerated in the drawing for the purpose of better explaining this invention.

The next step is to heat the portion 17, which is easily accessible, and gradually lay same down tight in a metal to metal contact with the outside of the pipe 11 as shown in Figure 3, after which the union is completed by means of a weld 18.

In order to grasp the significance of this invention it must be understood that the length of the overlap of the pipes should not exceed one half inch, even for pipes up to thirty inches in diameter or larger. It can be seen that with this small overlap, which ranges from one tenth to one sixtieth of the diameter of the pipe, that no appreciable amount of clearance is required in order to secure the desired amount of deflection ordinarily employed in such pipes.

What happens, of course, is that if a pipe is inserted into the bell as described and driven home, and sufficient force is applied to the end of the pipe to move it out of alignment with the pipe to which it is being coupled to an extent that would require the beveling of the pipe, as shown in Figures 2 and 3, it is evident that the circumference of the pipe around its angular edge is slightly greater than is the circumference of the interior of the bell perpendicular to its axis. In other words—as the inner pipe is deflected from the common axis it will, if necessary, stretch the material in the bell or compress the material in the inner pipe, according to governing conditions, the fact remaining that this deflecting operation increases the tightness of the joint, which is made a complete metal to metal joint. It is repeated that the clearance shown in Figures 1 and 2 is exaggerated merely to show its existence prior to the laying up of the pipe preceding the welding.

By turning to Figure 4 one can best understand the condition avoided by the method above described. In this case the pipe 19 slips loosely into the pipe 20 so as to provide a free annular space 21 between their overlapped sections. The weld 22 joins the end of the bell 23 to the pipe 19.

It will be observed in this case that when angularity is secured with a loose jointed pipe, as shown in Figure 4, that there will be a contact at the corners 24 and 25 and an increased free open space 26 and 27. Now it is easy to see that after having been joined together mechanically it is difficult to introduce any rust-resisting paint or substance which will completely protect the metal between the overlapped sections, and that even if these parts are so protected before insertion that it is almost certain to be removed in the assembling process, either by friction or by heat. The result is that the exposed metal is rusted and the eddy current set up in the free open space carries away this rust with the main body of water passing through the pipe, leaving the water free to make further encroachments on the metal in the bell 23, as shown in Figure 4, which experience has shown soon produces a large pit or cavity 28 in the already thinned metal of the bell, which finally gives way and produces a rupture in the pipe line.

To the layman this might appear to be quite similar to the bell end welded joint of common practice, but upon closer investigation it will be found that it is possible to secure the metal to metal contact the full length of the joint which is so desirable, for obvious reasons, because that portion of the joint which it would be impossible to tighten by welding and hammering is already tight, namely the extreme end of the straight pipe near the shoulder in the bell. It is this portion which it is especially desirable to have tight. The outer or flared end it is easy enough to tighten as described, as it is unsupported.

If the condition should be reversed and the connection be made looser at the shouldered end than at the outer end, or if it is merely a loose joint with the sides of the two members parallel it is evident that although a person could lay down the extreme end of the bell to a point where it would be easy to weld it would be practically impossible to reduce the diameter of the bell sufficiently to keep liquid out of the overlapping portions. What the joint really becomes when completed is a bell end connection having its bell portion concentric with the straight portion of the inserted pipe, regardless of the angularity existing between the pipes.

I am aware of many of the different methods which have been employed to join pipes by welding a bell ended joint; I therefore do not claim such joints broadly, but only intend to cover such forms of my device as fall fairly within the appended claims.

I claim:

1. A method of joining pipes together by a welding process consisting of forming a flared bell on the end of one pipe for a length of approximately one twentieth of its diameter, then driving a second straight pipe into said bell to seat against its shoulder, then heating and laying said flared bell metal to metal against the outside of said straight pipe and then welding the end of said bell to said straight pipe, the completed joint not forming a recess for the lodgment or circulation of liquids passing through the pipe.

2. A method of joining pipes at an angle by the welding process consisting of forming a flaring bell on the end of one pipe then angling the end of the second pipe in a manner to conform with the shoulder in said bell when the pipes are joined, the minimum inside diameter of said flared bell being approximately the outside diameter of the inserted pipe at its point of contact with said shoulder, and the maximum inside diameter of said bell near its outer end is sufficiently in excess of the outside diameter of said pipe to be inserted to permit the securing of the desired angularity, then driving said second pipe into said bell to seat against its shoulder at the angle desired, then heating and laying said flared bell against said inserted pipe to form a metal to metal contact all around same the full length of the overlap, then welding the edge of said bell to said inserted pipe.

FRED C. KING.